United States Patent [11] 3,551,659

[72] Inventor Charles O. Forsythe
892 Helen St., Teaneck, N.J. 07666
[21] Appl. No. 833,814
[22] Filed May 5, 1969
[45] Patented Dec. 29, 1970

[54] METHOD FOR DEBUGGING COMPUTER PROGRAMS
14 Claims, 15 Drawing Figs.

[52] U.S. Cl. 235/153, 340/172.5
[51] Int. Cl. G06f 11/04
[50] Field of Search 340/172.5, 146.1; 235/153

[56] References Cited
UNITED STATES PATENTS
3,415,981 12/1968 Smith et al. 235/153
3,286,239 11/1966 Thompson et al. 340/172.5
OTHER REFERENCES
K. Maling, Program Supervisor, IBM Technical Disclosure Bulletin, Vol. 3, No. 9, February 1961, pp. 12 and 13.

*Primary Examiner*—Malcolm A. Morrison
*Assistant Examiner*—Charles E. Atkinson
*Attorney*—Bryan, Parmelee, Johnson & Bollinger

ABSTRACT: A debugging method is provided in a debugging program which is fed into the computer along with the problem program being tested. The debugging method is intended to enable a problem program to be automatically debugged in the minimum number of test shots by uncovering the maximum number of errors in each test case during every test shot. The debugging method includes a module point checking routine capable of returning the problem program to the proper path in the processing each time a branching error occurs, correcting all error values checked, and keeping the programmer advised as to what has been done; an instruction control routine capable of controlling the execution of each successive instruction in the problem program so that if certain types of serious errors are encountered they will be noted for the programmer allowing the processing of the problem program to continue instead of terminating the test shot prematurely. Each test case in every test shot will be processed to its logical conclusion despite problem program errors that would normally stop or sidetrack the processing of that case.

Figure 1:
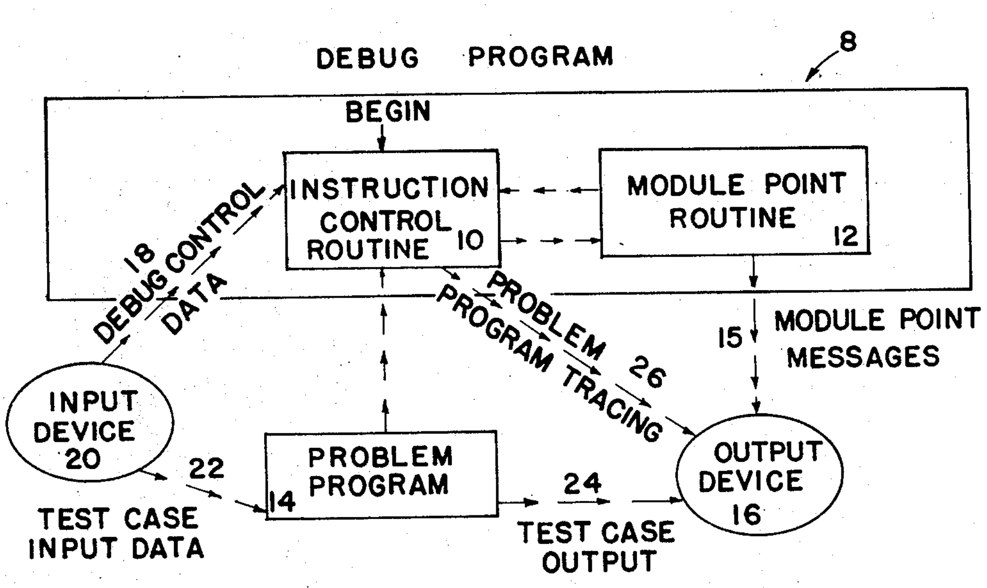
Figure 2A:
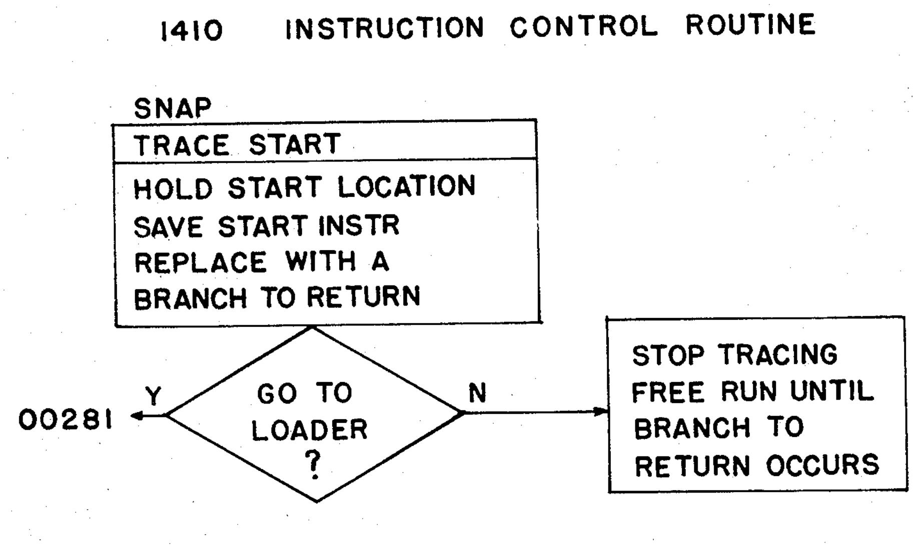
Figure 2B:
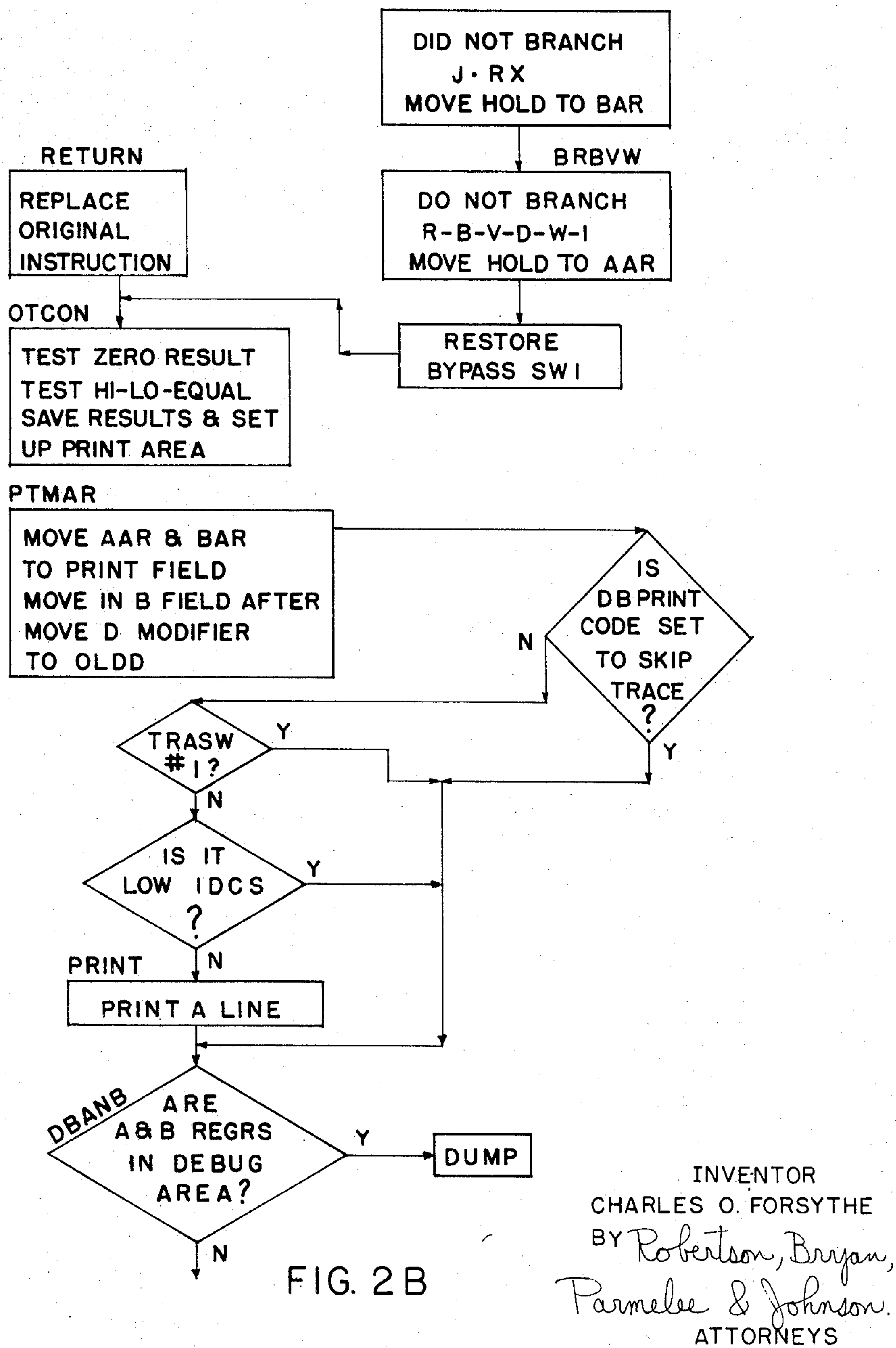
Figure 2C:
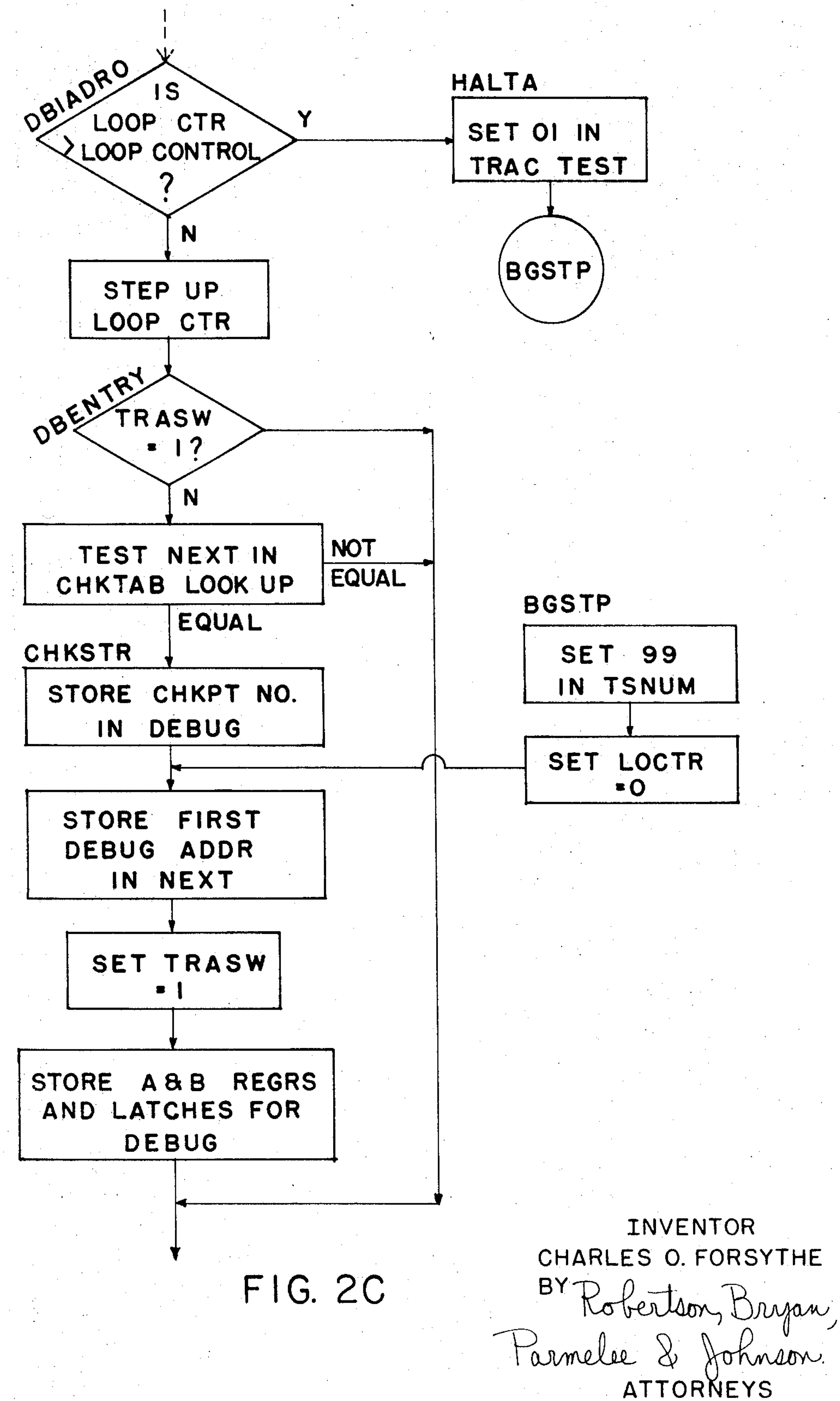
Figure 2D:
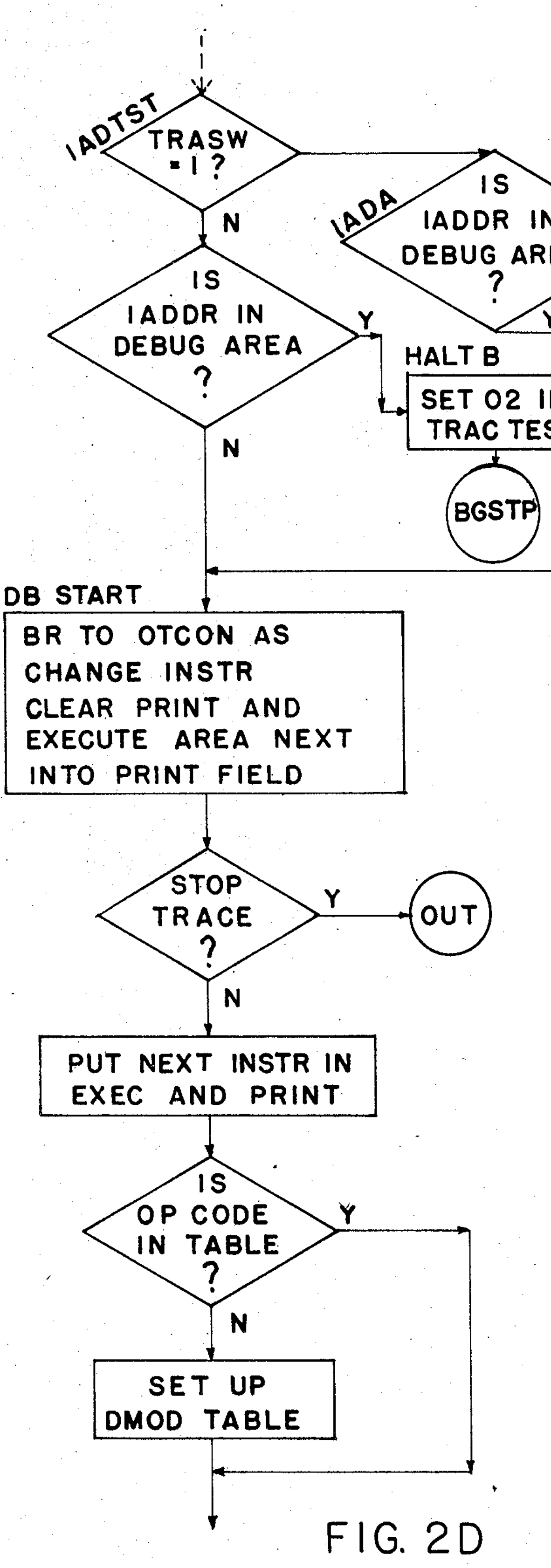
Figure 2E:
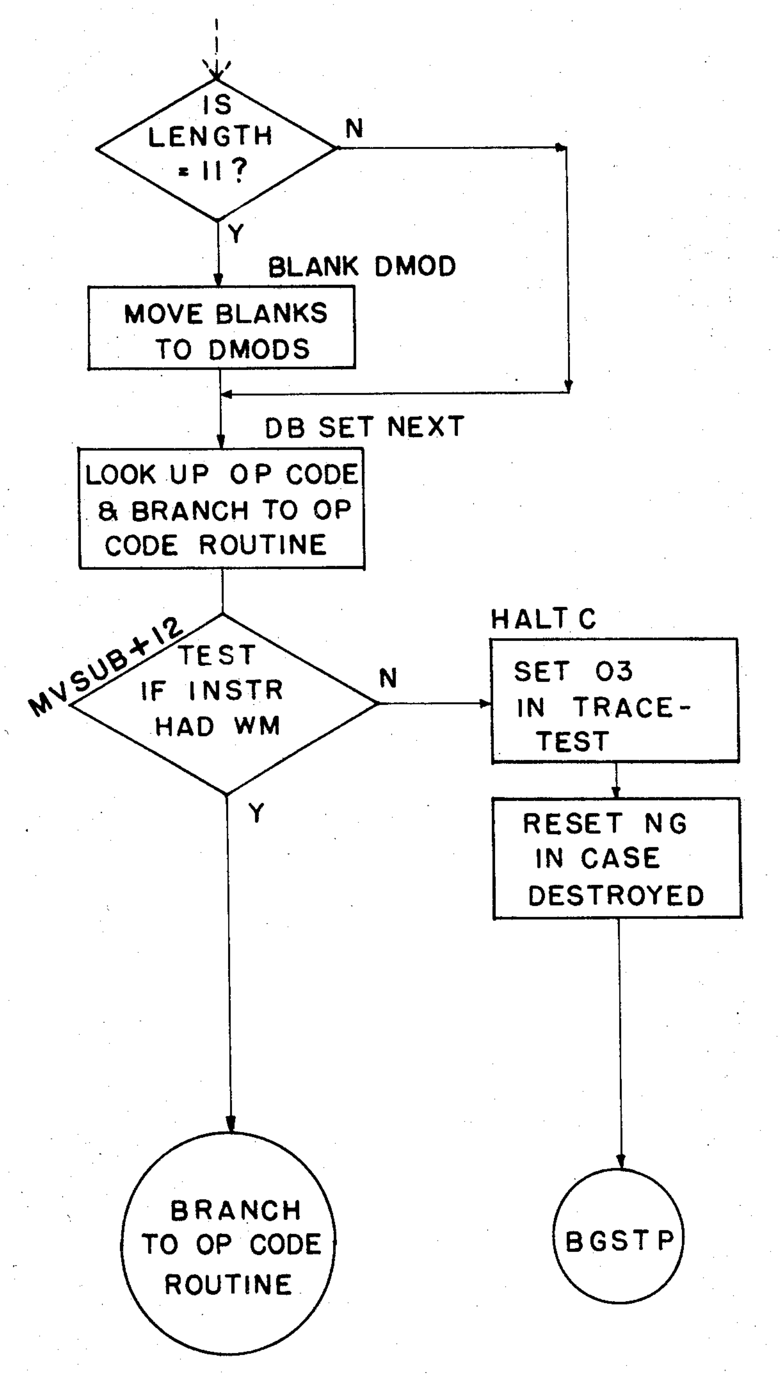
Figure 2F:
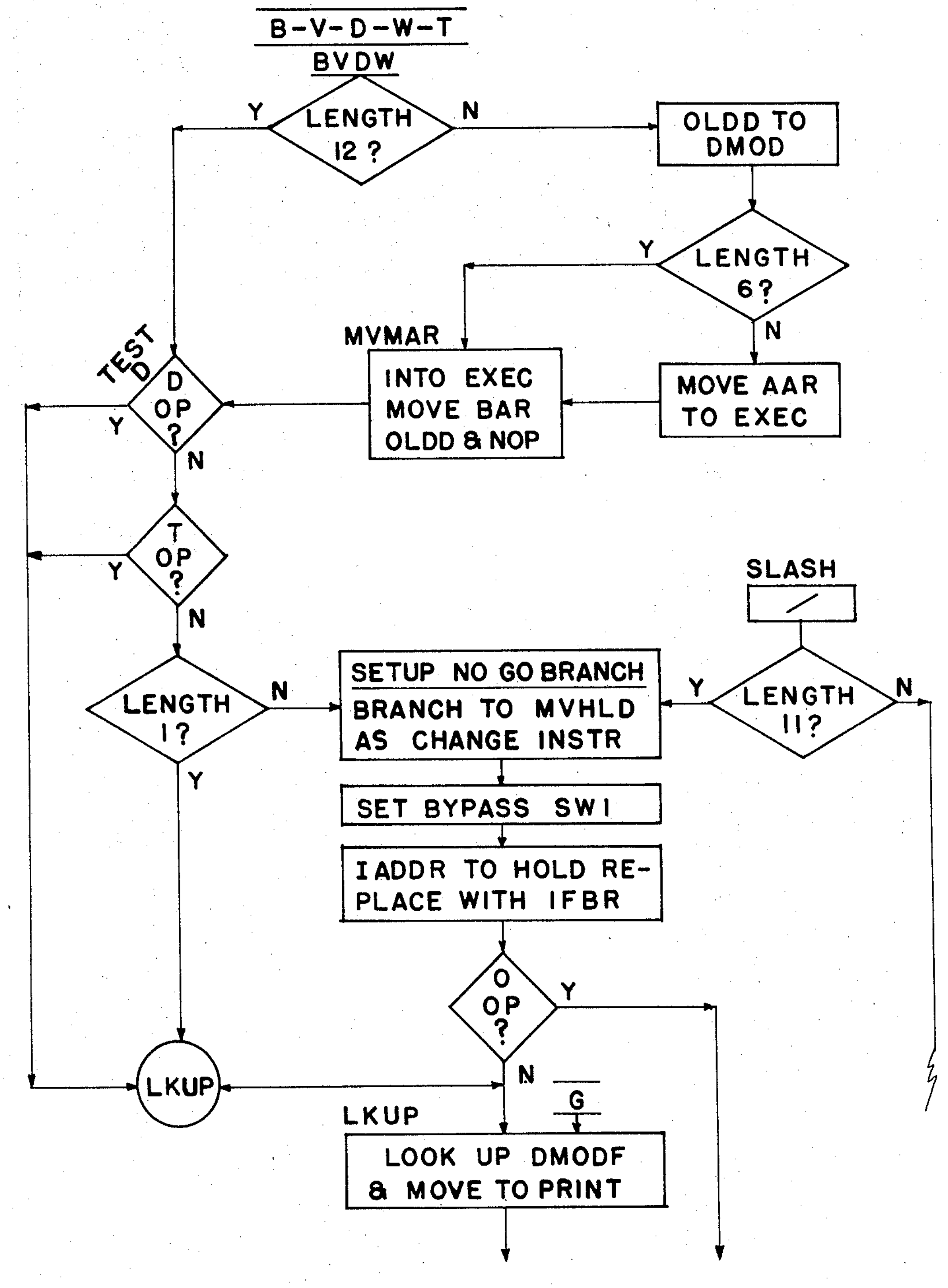
Figure 2G:
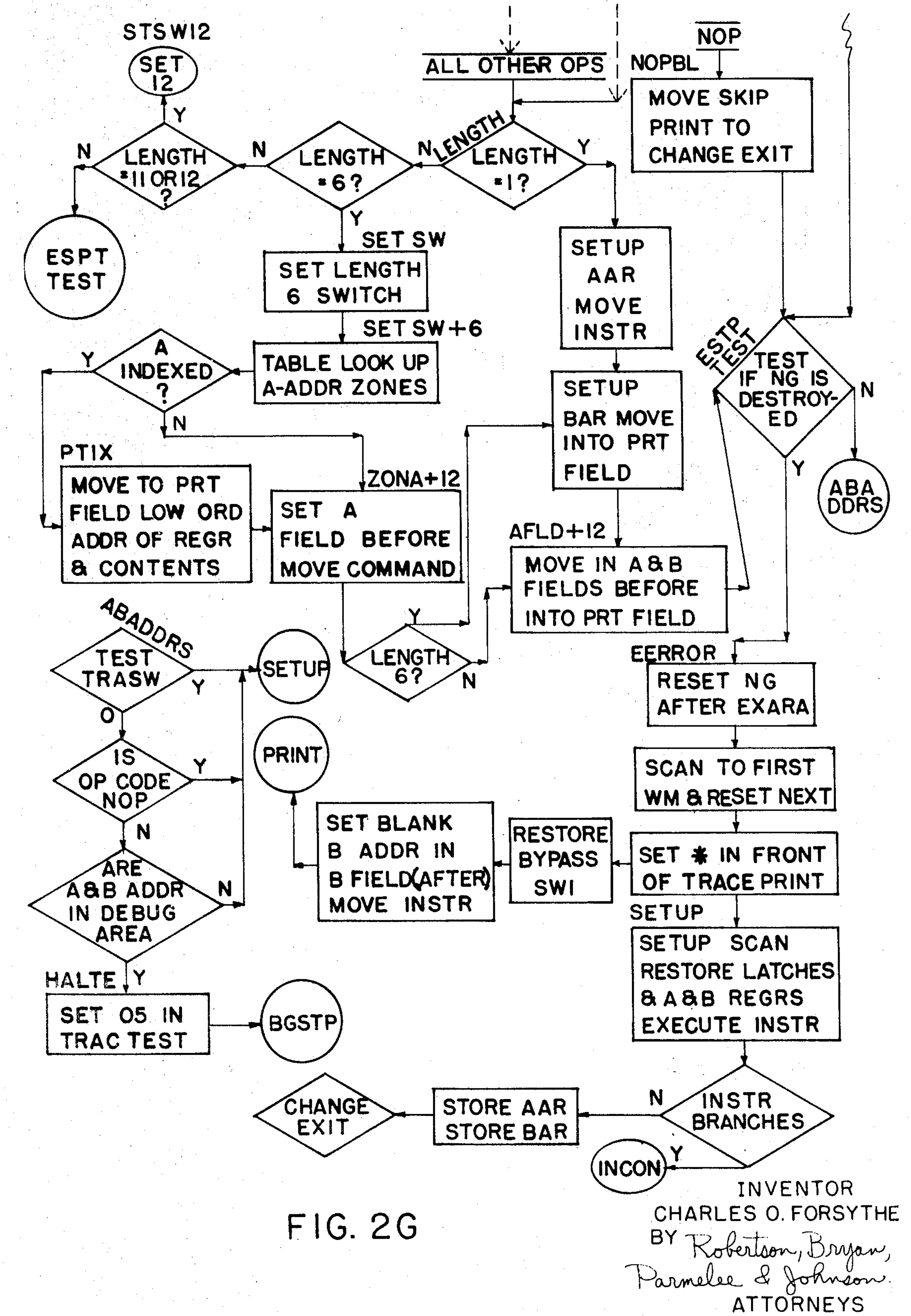
Figure 2H:
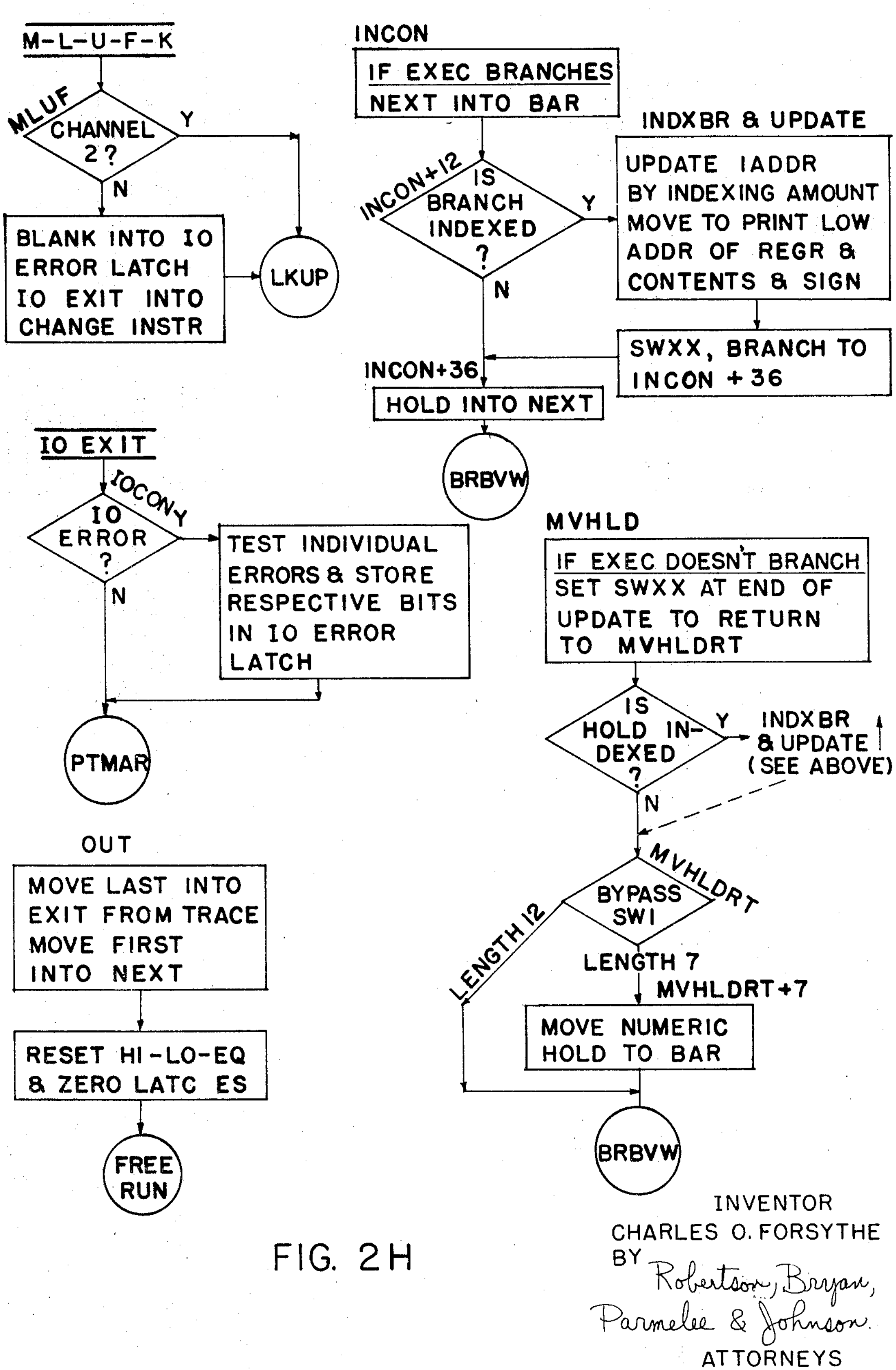
Figure 2I:
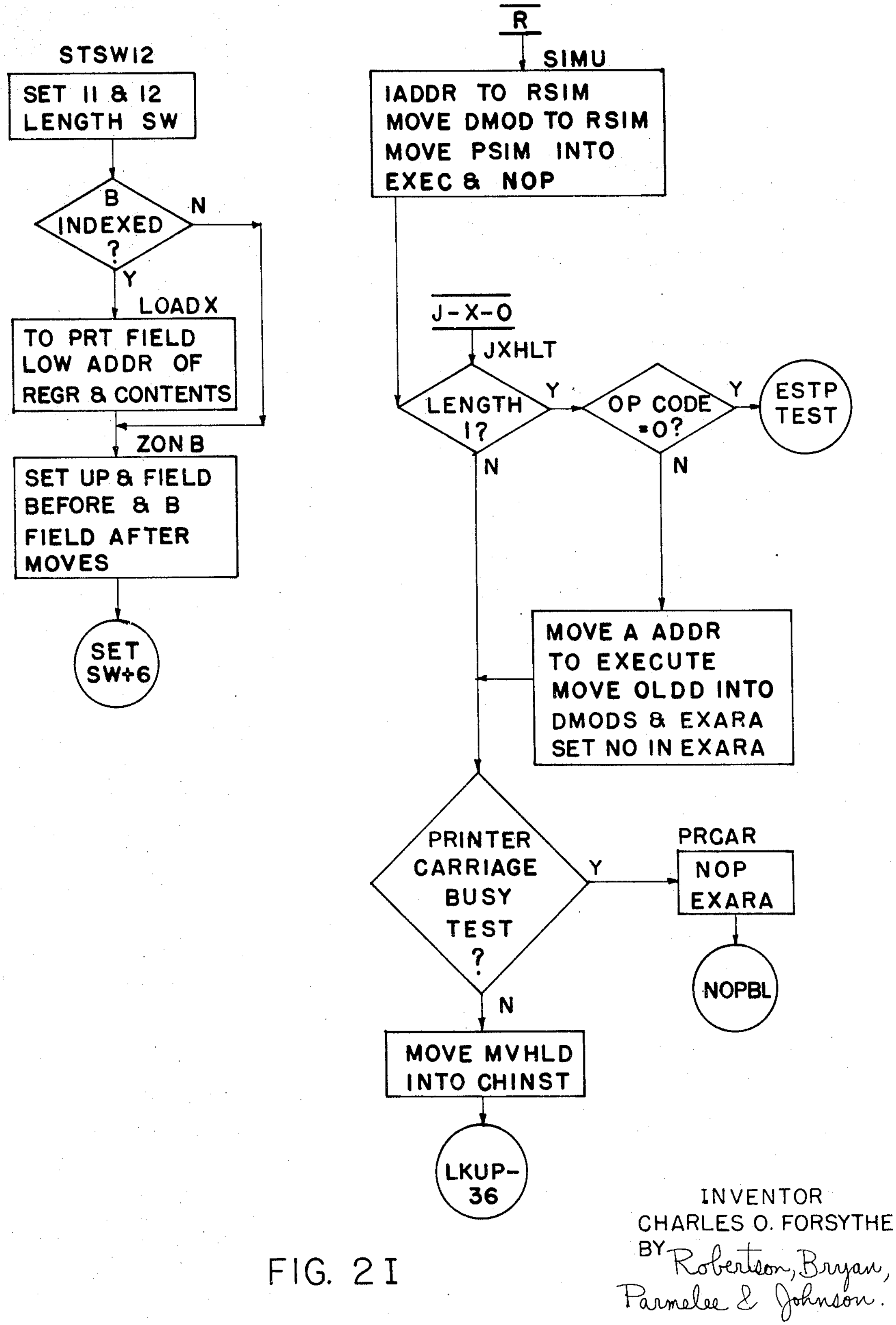

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson.
ATTORNEYS

INVENTOR
CHARLES O. FORSYTHE
BY Robertson, Bryan, Parmelee & Johnson
ATTORNEYS

PATENTED DEC 29 1970 3,551,659

SHEET 04 OF 14

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson
ATTORNEYS

PATENTED DEC 29 1970 3,551,659

SHEET 07 OF 14

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson.
ATTORNEYS

INVENTOR
CHARLES O. FORSYTHE
BY Robertson, Bryan, Parmelee & Johnson.
ATTORNEYS

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson.
ATTORNEYS

INVENTOR
CHARLES O. FORSYTHE
BY Robertson, Bryan, Parmelee & Johnson
ATTORNEYS

INVENTOR
CHARLES O. FORSYTHE
BY Robertson, Bryan, Parmelee & Johnson
ATTORNEYS

METHOD FOR DEBUGGING COMPUTER PROGRAMS

A novel method to debug or locate errors in new problem computer programs is herein disclosed.

Current methods utilized to detect errors in problem programs generally require termination of the test shot when many types of serious errors are encountered because there is no control over the errors in the problem program. Further, if the test shot is not terminated, the risk is substantial that valuable computer time will be wasted by multiplying the errors while getting little or no correct debugging information. Thus, with current methods the test results are directly dependent on the number and types of programming errors encountered.

The novel debugging method herein disclosed maintains control of the error results and minimizes the risk of wasted computer time. The problem program is kept running until the last test case is completed. Also the presence of multiple serious errors in the processing of any test case will not be allowed to terminate the testing of that test case until its has been thoroughly processed to its logical conclusion. Thus in any given test shot case it will be possible to detect many more errors in it test case than by current methods.

A debugging program is fed into the computer along with the problem program being debugged. This debugging program includes a module point checking routine and an instruction control routine.

To utilize this method the programmer chooses a number of points in the problem program at which he desires to temporarily suspend the processing of the problem program and branch to the module point checking routine in order to check on the status of the test shot up to that point. The addresses of the problem program instructions at which suspension will occur are called module points. The addresses of these module points are stored in a module point table in the debugging program and are assigned module point numbers in accordance with their relative positions in the table. Information showing the different sequence in which these module points should be encountered by each test case, if there were no errors in the problem program, is stored in a module schedule table in the debugging program.

Further, values tables are provided in the debugging program containing the addresses of important storage locations which may be checked and corrected when the module points are encountered and also the correct values that should be in these storage locations if there were no errors in the problem program. For the convenience of the programmer, two additional tables called label tables, may also be provided in the debugging program. These label tables contain the addresses in symbolic language of the module point locations and also the storage locations whose values are to be checked and corrected. The information which the programmer enters in the module point table, the module schedule table, the values table, and the label tables will be referred to collectively as control data.

As the processing of the problem program proceeds various module points will be encountered whereby the processing of the problem program is temporarily suspended causing the processing to branch to the module point checking routine.

The module point routine notes the module point just encountered and examines the module schedule to see if it has reached the proper scheduled module point in the proper sequence. If it has not, the module point routine directs control back to the correctly scheduled module point. It is then noted what storage location should be checked at the correct module point. Generally, that storage value is checked against the value shown in the values table and if they do not agree, the storage value is corrected. However, if the test case is sidetracked or advanced to the next scheduled module point as explained later in this disclosure, the value will be corrected, but not checked since it can be assumed there is an error present. A one-line module point message is then printed showing which module point should have been encountered, which module point was actually encountered, which storage location was checked, what the contents of that storage location should have been, what the contents of that location actually were, and what types of errors were found, if any. The module point routine is then terminated and processing of the test case in the problem program is resumed with the problem program instruction at the correct scheduled module point, continuing execution of the problem program instructions for the same test case until the next module point is encountered at which time the module point routine is again repeated.

Symbolic language is used instead of actual addresses in storing the module points, in storing the locations to be checked in the values table and when printing the module point messages. This utilization of symbolic language instead of actual machine addresses allows the debugging program to operate on a problem program which is relocatable.

The module point routine keeps putting the problem program back on the correct path each time it is sidetracked by an erroneous instruction, corrects all the error values it checks, and keeps the programmer advised as to what has been done.

The instruction control routine is capable of controlling the execution of each successive instruction in the problem program between module points. If certain types of errors that would normally terminate the test shot are encountered, they will be noted for the programmer and the processing of the same test case will continue at the next scheduled module point instead of terminating the test shot. Some of the errors that the instruction control routine recognizes are as follows:

1. Invalid instructions.
2. Endless error loops between module points.
3. Division by zero.
4. Instructions referring to addresses where the debugging program is stored; this type of error in the problem program might try to mutilate the debugging program.

If any of these errors are encountered they are called to the programmer's attention. If the error is an invalid instruction, the error instruction and its location are written on the output device and the processing of the problem program continues at the next sequential instruction. For any other type of errors listed above, the debugging program proceeds to the next scheduled module point in the same test case and goes into the module point checking routine, as previously described. Here again, the type of error found by the instruction control routine is noted on the output device in the one-line module point message and the processing of the problem program is resumed at the correct module point.

It should be noted that the instruction control routine is capable of tracing the results of each instruction between any specified module points for any specified test case. This can be very useful in extreme circumstances where all other methods have failed to locate a recurring error.

It is an advantage of this novel debugging method that each test case in the problem program is kept processing on the right track regardless of the errors encountered which may try to sidetrack or stop it. This method locates many more errors in each test shot by allowing the problem program to continue each test case instead of terminating when an error is encountered.

This new approach to debugging problem programs is intended for general use. It can be used on almost any type of computer, e.g., the IBM 360; it can be used for problem programs written in machine language, symbolic language or higher languages; and it can be used with or without operating system control of the problem program.

Programmer time is saved by highlighting errors in the module point messages and correcting error results at the point in the processing at which they occur, thereby eliminating many of the secondary errors that stem from the primary errors earlier in the program. Computer time is saved by reducing the number of test shots and by minimizing the possibility of wasted machine time resulting from endless error loops and other useless processing caused by error branches. This dual saving in programmer and computer time thereby accelerates the completion date of the finished problem program.

In summation, this novel debugging method uses three basic elements in order to achieve its desirable objectives:

1. Keeping the problem program on the correct path when sidetracked by certain errors.
2. Making controlled corrections at the proper points in the processing.
3. Continuing the processing of each test case to its logical conclusion after encountering errors that would normally terminate a test shot.

Various other features and advantages of the present debugging method will be more fully understood when the following description is considered in conjunction with the accompanying FIGS.

FIG. 1 is a flowchart showing generally how the problem program, the instruction control routine, the module point routine and the input and output devices cooperate in the debugging method.

FIGS. 2A—2I are detailed flowcharts showing generally the steps in the instruction control routine.

Figure 3A:
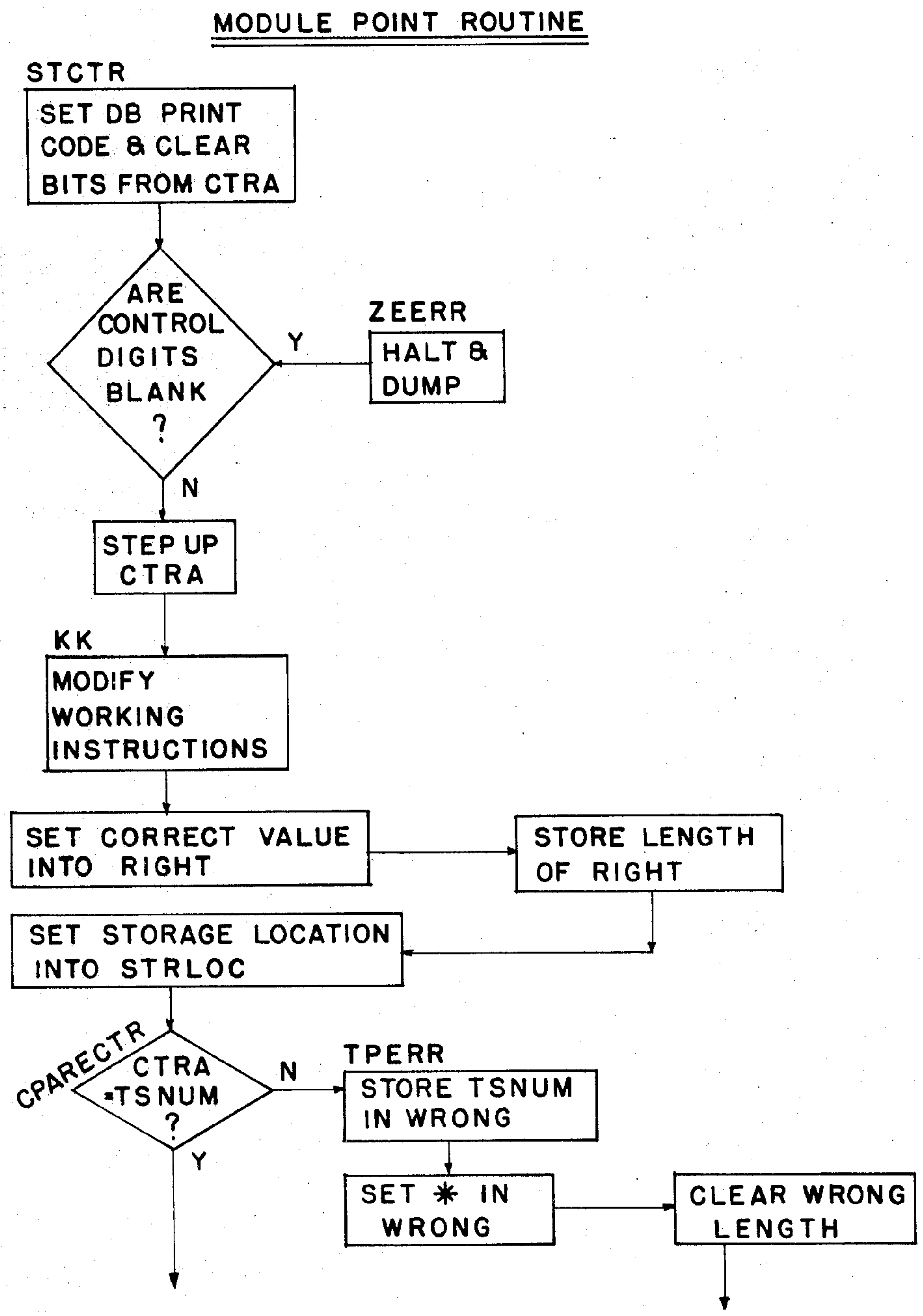
Figure 3B:
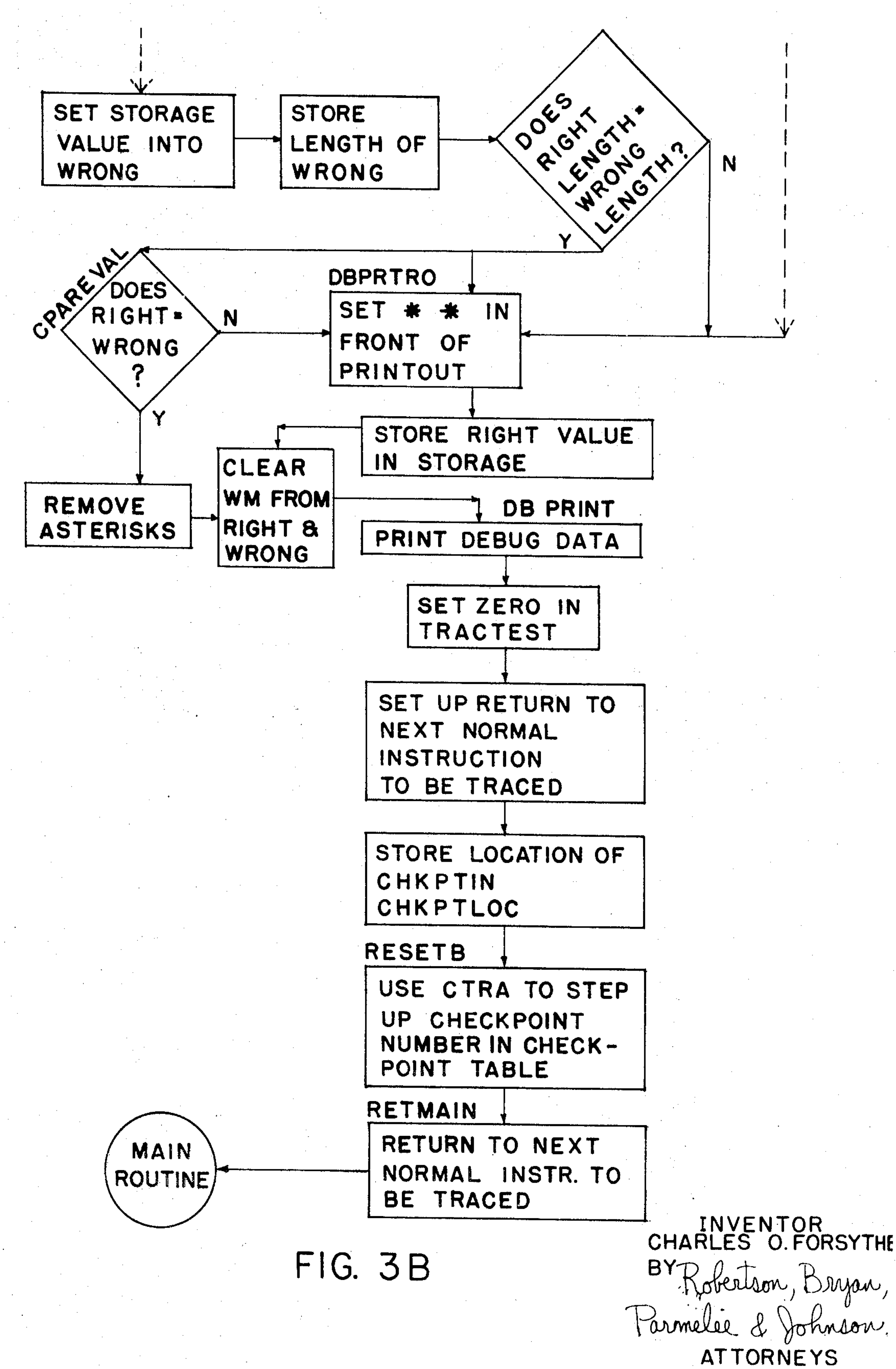

FIGS. 3A and 3B are detailed flowcharts showing generally the steps in the module point routine.

Figure 4A:
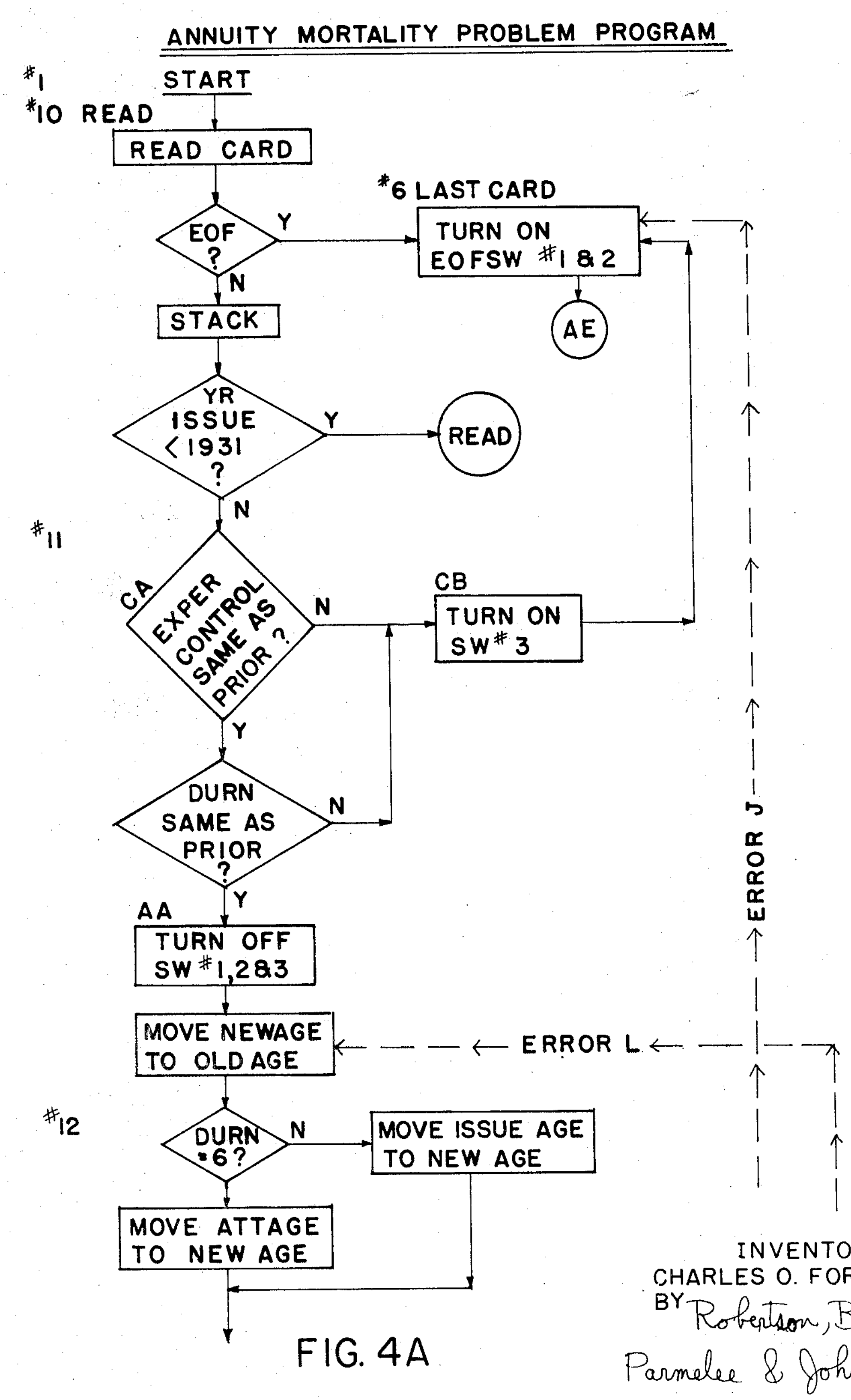
Figure 4B:
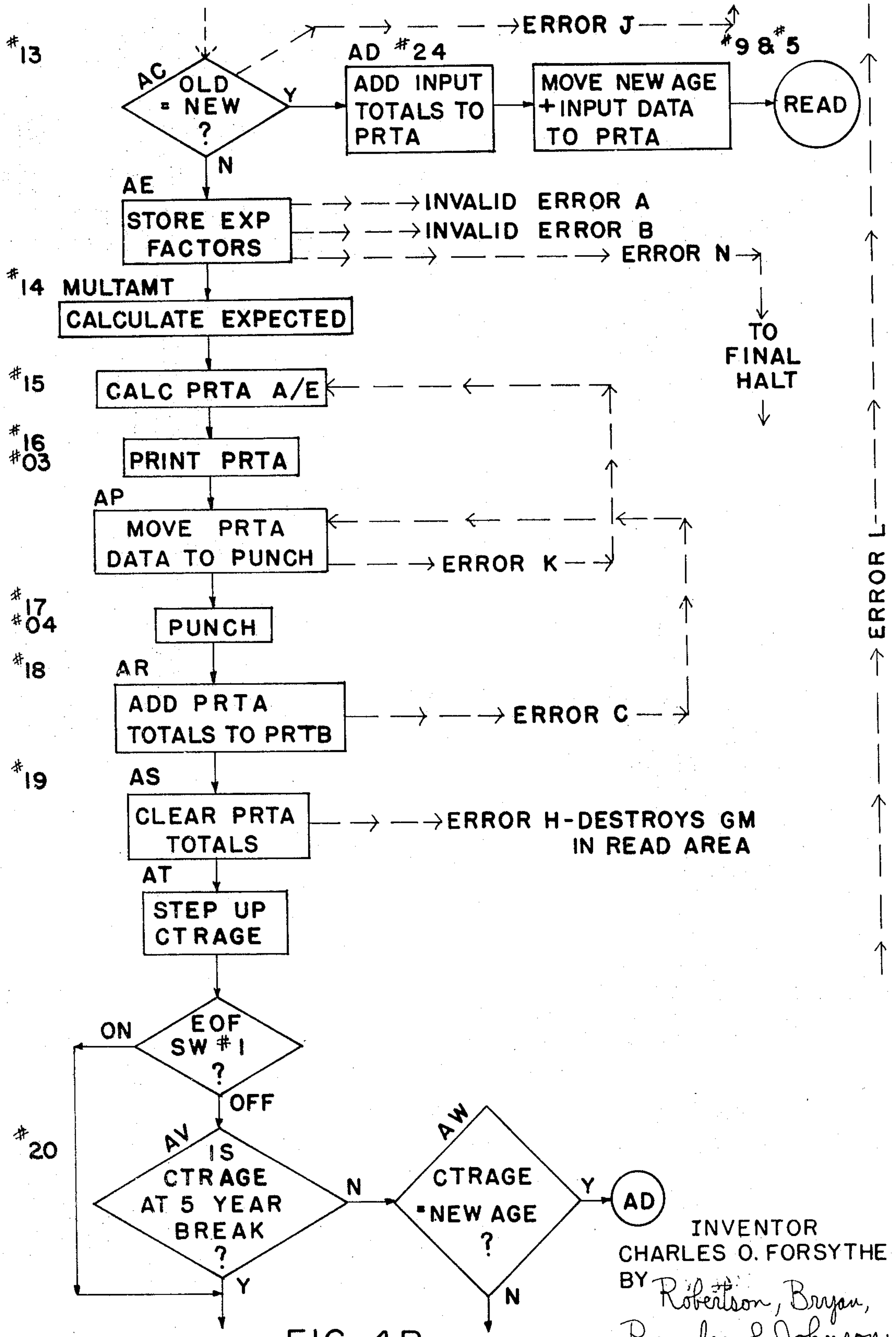
Figure 4C:
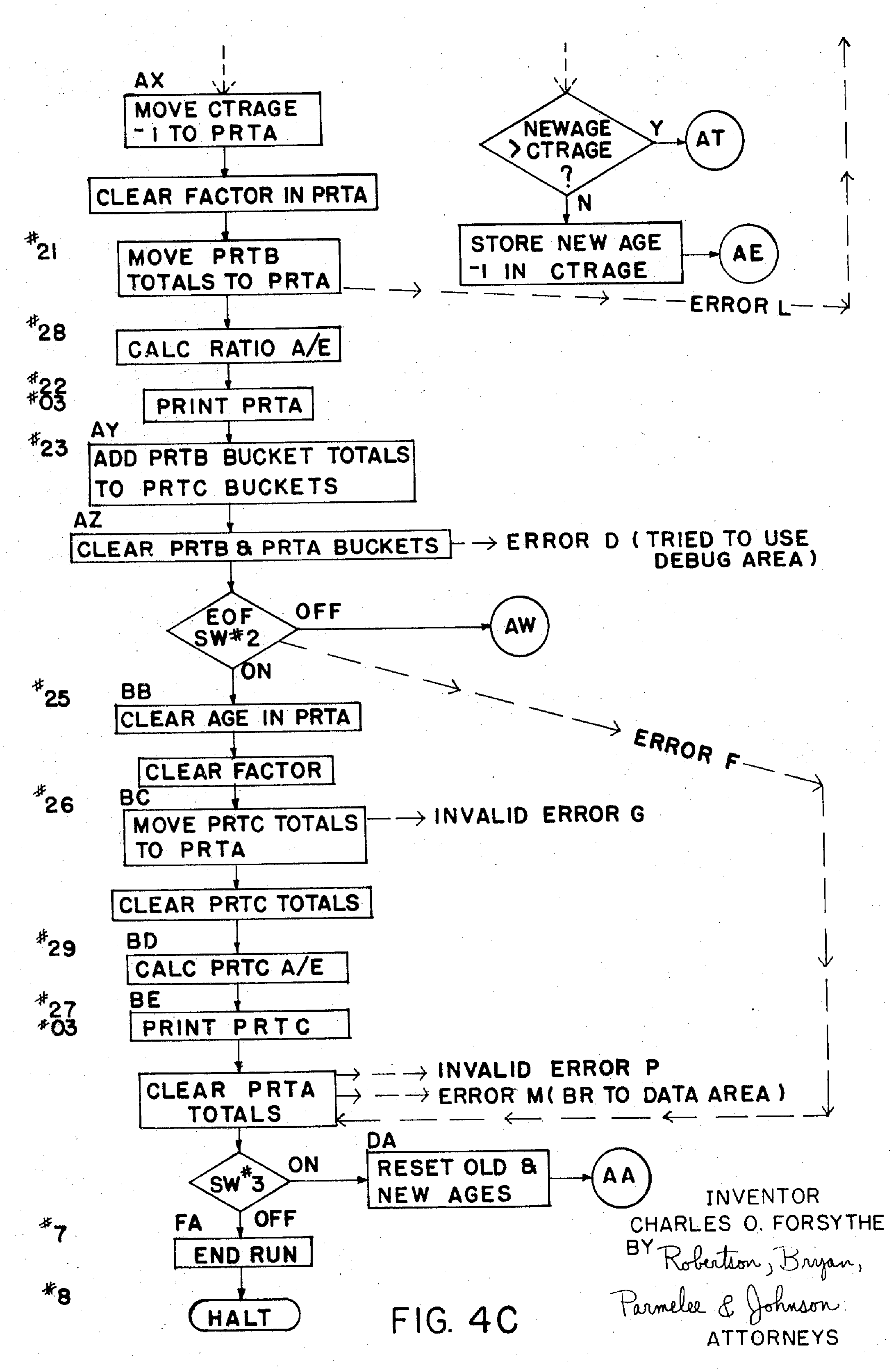

FIGS. 4A—4C are flowcharts showing an annuity mortality sample problem program with sample errors overlayed.

As shown in FIG. 1, this debugging method utilizes a separate and distinct debugging program 8 having as its basis of operation the interrelation between an instruction control routine 10 and a module point routine 12. Control of the problem program 14 begins at the instruction control routine 10 and moves back and forth between the instruction control routine 10 and the module point routine 12. The instructions control routine 10 supervises the execution of each instruction in the problem program 14 after testing the instruction for various types of errors. The module point routine 12 analyzes the test case results at each module point, makes corrections where indicated, and prints out a one-line module point message 15 on the output device 16.

Control data 18 will normally vary for each test case and may be read from the same input device 20 as the test input data 22. The order of the input on the input device 20 will be first control data, first test case, second control data, second test case, etc. However, all module points and label names to be used are generally entered only once with the first control data, thereby remaining unchanged during the entire test. The module points that are not scheduled to be used with a specified test case may still perform a valuable function by catching and resetting the problem program after it has erroneously branched into the routines of these unscheduled module points.

Control begins at the instruction control routine 10 which loads the first control data from the input device 20 into the debug tables. Then the instructions control routine 10 controls the processing of the problem program 14 while the problem program 14 reads the first test case input data 22 into the computer from the input device 20, executes the problem program instructions, and prints the first test case output 24 on the output device 16. Then the instruction control routine 10 loads the second control data 18 from the input device 20 into the same debug tables and resumes control of the problem program 14 while it reads the second test case input data 22 into the computer from the input device 20, executes the problem program instructions and prints the second test case output 24 on the output device 16. This continues until all of the test cases are processed.

Whenever the instruction control routine 10 reaches a module point address in the problem program, processing of the problem program is temporarily suspended and the module point routine 12 commences. The module point routine 12 analyzes the test case results at the module point reached, makes any necessary corrections, prints the module point message 15 on the output device 16 and then returns to the instructions control routine 10 to supervise the execution of the next problem program instruction at the correct module point, continuing the processing until the next module point is reached.

While the instruction control service 10 is controlling the execution of the problem program instructions, any desired tracing information 26 can be printed on the output device 16 for any specified segments of the problem program 14.

Thus, the output device 16 will produce the test case output 24, the module point messages 15, and perhaps some tracing of the base program 26 interspersed in exactly the order in which they occurred.

Normally many types of serious errors in the problem program 14 will terminate the test shot and cause the input and output devices, 20 and 16, respectively, to stop the testing and rewind before all of the test input cases have been completely processed. With the present debug method the input device 20 will continue reading in the test case input data 22 and the output device 16 will continue receiving test case output data 24 until all of the test cases have been processed. Only then will the input and output devices 20 and 16, respectively, stop and rewind.

FIGS. 2 and 3 are detailed, self-explanatory, flowcharts showing the individual steps performed by the debugging program.

Appendix A considered with FIG. 4 illustrates an example of how the debug method worked on a 1410 Autocoder sample program nonmonitor, to produce the output listing shown in appendix A-3.

The 13 errors shown in appendix A-1 were overlayed in machine language in the sample problem program flowcharted in FIG. 4. Most of these are serious errors that would have terminated a normal test shot prematurely.

The total test shot consisted of five test cases and an End of File (LASTCARD) routine. They were processed under control of the debug method and the first test shot caught 12 of the 13 errors and finished up at the problem program's final HALT instruction. The thirteenth error (error F) was caught in the second test shot.

Appendix A-2 shows the proper path for each test case in the test shot. The path for the first three test cases is identical. The fourth and fifth cases and the End of File routine are progressively more complex. Since most of the errors are in the later parts of the sample problem program, the first three cases caught only error J: the fourth case caught additional errors K and C; the fifth case caught further errors L and D; and the End of File routine caught additional errors H,A,B,N,G,P, and M.

Looking at the output listing in appendix A-3 we see that in the fifth line of the first case that the first error J was caught by the module point at LASTCARD and was sent back to the correct module point at AD. The second and third cases hit the same error and handled it the same way. In the fourth case error J was again caught by the module point at LASTCARD, but this time it was correctly sent back to the module point at MULTAMT instead of AD.

In the fifth case one of the errors caught was error D which showed the note DBUG on the extreme right-hand side of the module point message. This means that an error instruction in the problem program tried to use a location in the debug area and that the error instruction was located at 07374 in the problem program. We seen from appendix A-1 that the debug method had analyzed error D correctly.

Note that errors C, K, and L are endless error loops each of which would normally cause the computer operator to eventually stop the program. In all three instances the module points caught the errors very shortly after they got off the track and before they ever got a chance to start looping. Compare these to the error caught in the eleventh line of the fourth test case; the note on the extreme right says LOOP. This was not an error that we intentionally overlayed. The I/O punch routine found the punch device was not ready and went into a waiting loop. When the maximum number of instructions allowed by the debug method was exceeded before the puncher was made ready, the instruction control routine interpreted this as an endless error loop and jumped to the next correct module point at AR and after printing the module point message it continued processing the problem program. This demonstrated the power of this method to handle almost any situation that may arise.

Errors A, B, G and P are different types of invalid instructions. These errors were all caught in the End of File routine. Note that the invalid machine instructions and their locations were printed out even though the valid instructions were not being traced.

It should be noted that under most of the current debugging methods without the debug program, errors J and A would have been the only errors caught in the first test shot. The first test case would have been read but not processed and the other four test cases would not have been read before the test shot was terminated by error A.

Appendix B shows the output of the debug method when used with a 1410 COBOL program run under the 1410 Operating System. The types of errors encountered in the COBOL program are of course quite different from the Autocoder program. Note that the COBOL trace of paragraph labels was used in this test shot.

Appendix C is a listing of the debug source program in symbolic Autocoder language, preceded by the sample annuity mortality test program shown in FIG. 4 and followed by the control data used for the sample test shot to produce the sample output listing shown in appendix A-3.

It should be apparent that convenience may dictate that the test input data be located on a different input device from the control data or that the test output data be located on a different output device from the module point messages without affecting the results of the debug method.

However, it should be understood that the essence of this method will apply to all computers. For example, modifications or omissions of the control of individual problem program instructions by the instruction control routine in part or in its entirety, may be made when the debugging program is used with some computers which may have systems capable of catching errors, recording them and turning control over to the debug program for continued processing without controlling the individual instructions of the problem program.

It should be apparent to one skilled in the art that various modifications may be made in the debugging method herein disclosed without departing from its spirit or scope, whereby a problem program is processed through a complete test shot allowing the detection of a high percentage of serious errors in the single test shot.

I claim:

1. A method for debugging a problem program for use in an electronic digital computer by utilizing a separate debugging program for controlling the processing of the problem program instructions by the computer, said debugging program being comprised of a module point checking routine and an instruction control routine, said method comprising the steps of:

a. executing said instruction control routine to supervise execution of the problem program instructions between selected addresses in the problem program called module points and note various types of errors in the problem program instructions;
b. storing the addresses of said module points at which point the processing of the problem program is to be suspended;
c. temporarily suspending execution of the problem program instructions when the module points are encountered;
d. executing said module point checking routine to note and compensate for erroneous problem program instructions while execution of the problem program is temporarily suspended;
e. resuming execution of the problem program with the correct problem program instruction after the module point checking routine is completed;
f. upon recognition of certain type of errors in the problem program, proceeding immediately to the next scheduled module point under control of the instruction control routine and steps (c), (d) and (e) are repeated whereby the processing of the problem program is continued to its logical conclusion even though errors may be encountered which would normally terminate the processing 2. A method for debugging a problem program for use in an electronic digital computer as claimed in claim 1 having input and output devices comprising the steps of:

a. continuously feeding test case input data to the computer from said input device even when errors are encountered in the problem program instructions; and
b. continuously receiving test case output data from the computer at said output device even when errors are encountered in the problem program instructions.

3. A method for debugging a problem program for use in an electronic digital computer as claimed in claim 1 comprising the steps of:

a. storing the sequence in which the module points should be reached in the absence of erroneous problem program instructions;
b. associating certain module points with specified computer storage locations; and
c. executing said module point checking routine to check and correct the value in the specified computer storage location for the module point scheduled to be reached in the absence of erroneous problem program instructions.

4. A method for debugging a problem program for use in an electronic digital computer as claimed in claim 3 comprising the steps of:

a. printing a module point checking routine message showing the module point which should have been encountered, the module point which was actually encountered, the computer storage location which was checked, what the contents of that computer storage location should have been in the absence of erroneous problem program instructions, what the contents of that computer storage location actually were, and what types of errors, if any, were found;
b. terminating the module point checking routine after step (a); and
c. resuming execution of the problem program with the problem program instruction following the correctly scheduled module point until the next module point is encountered whereby steps (a), (b), and (c) are repeated.

5. A method for debugging a problem program for use in an electronic digital computer by utilizing a separate debugging program for controlling the processing of the problem program instructions by the computer, said debugging program being comprised of a module point checking routine and an instruction control routine, said method comprising the steps of:

a. executing said instruction control routine to supervise execution of the problem program instructions between selected addresses in the problem program called module points and note various types of errors in the problem program instructions;
b. storing the addresses of said module points at which point the processing of the problem program is to be suspended;
c. temporarily suspending execution of the problem program instructions when the module points are encountered;
d. executing said module point checking routine to note and compensate for erroneous problem program instructions while execution of the problem program is temporarily suspended;
e. resuming execution of the problem program with the correct problem program instruction after the module point checking routine is completed;
f. recording any invalid instructions encountered in the control of each successive instruction in the problem program between module points; and g. continuing execution of the problem program with the next problem program instruction after the recording step (f).

6. A method for debugging a problem program for use in an electronic digital computer as claimed in claim 5 having input and output devices comprising the steps of:

a. continuously feeding test case input data to the computer from said input device even when errors are encountered in the problem program instructions; and b. continuously receiving test case output data from the computer at said output device even when errors are encountered in the problem program instructions.

7. A method for debugging a problem program for use in an electronic digital computer as claimed in claim 5 comprising the steps of:

a. storing the sequence in which the module points should be reached in the absence of erroneous problem program instructions;

b. associating certain module points with specified computer storage locations; and c. executing said module point checking routine to check and correct the value in the specified computer storage location for the module point scheduled to be reached in the absence of erroneous problem program instructions.

8. A method for debugging a problem program for use in an electronic digital computer as claimed in claim 7 comprising the steps of:

a. printing a module point checking routine message showing the module point which should have been encountered, the module point which was actually encountered, the computer storage location which was checked, what the contents of that computer storage location should have been in the absence of erroneous problem program instructions, what the contents of that computer storage location actually were, and what types of errors, if any, were found;

b. terminating the module point checking routine after step (a); and c. resuming execution of the problem program with the problem program instruction following the correctly scheduled module point until the next module point is encountered whereby steps (a), (b) and (c) are repeated.

9. A method for debugging a problem program for use in an electronic digital computer having systems capable of recording errors in the problem program and then continuing the processing of the problem program without controlling the execution of each individual problem program instruction by utilizing a separate debugging program for controlling the processing of the problem program instructions by the computer, said debugging program comprising a module point checking routine, said method comprising the steps of:

a. storing selected addresses of the problem program instructions called module points at which point processing of the problem program is to be suspended;

b. temporarily suspending execution of the problem program instructions when said modular points are encountered;

c. executing said module point checking routine to note and compensate for erroneous problem program instructions while execution of the problem program is temporarily suspended; and d. resuming execution of the problem program with the correct problem program instruction after the module point checking routine is completed.

10. A method for debugging a problem program for use in an electronic digital computer as claimed in claim 9 having input and output devices comprising the steps of:

a. continuously feeding test case input data to the computer from said input device even when errors are encountered in the problem program instructions; and b. continuously receiving test case output data from the computer at said output device even when errors are encountered in the problem program instructions.

11. A method for debugging a problem program for use in an electronic digital computer as claimed in claim 9 comprising the steps of:

a. storing the sequence in which the module points should be reached in the absence of erroneous problem program instructions;

b. associating certain module points with specified computer storage locations; and c. executing said module point checking routine to check and correct the value in the specified computer storage location for the module point scheduled to be reached in the absence of erroneous problem program instructions.

12. A method for debugging a problem program for use in an electronic digital computer as claimed in claim 11 comprising the steps of:

a. printing a module point checking routine message showing the module point which should have been encountered, the module point which was actually encountered, the computer storage location which was checked, what the contents of that computer storage location should have been in the absence of erroneous problem program instructions, what the contents of that computer storage location actually were, and what types of errors, if any, were found;

b. terminating the module point checking routine after step (a); and c. resuming execution of the problem program with the problem program instruction following the correctly scheduled module point until the next module point is encountered whereby steps (a), (b) and (c) are repeated.

13. A method for debugging a problem program for use in an electronic digital computer by utilizing a separate debugging program for controlling the processing of the problem program instructions by the computer, said method comprising the steps of:

a. continuing execution of the problem program when errors in problem program instructions are encountered;

b. compensating for erroneous problem program instructions at selected points in the problem program called module points which may be associated with specified computer storage locations; and c. recording certain types of errors encountered between said module points and proceeding immediately to the next scheduled module point whereby the problem program is processed to its logical conclusion even though errors may be encountered which would normally terminate the processing.

14. A method for debugging a problem program for use in an electronic digital computer by utilizing a separate debugging program for controlling the processing of the problem program instructions by the computer, said method comprising the steps of:

a. continuing execution of the problem program instructions when errors in problem program instructions are encountered;

b. compensating for erroneous problem program instructions at selected points in the problem program called module points which may be associated with specified computer storage locations; and c. recording certain types of errors encountered between said module points and continuing execution of the problem program with the next problem program instruction whereby the problem program is processed to its logical conclusion even though errors may be encountered which would normally terminate the processing.